Nov. 15, 1955     LE ROY B. CARLSON     2,723,518
ROTARY MOWER ATTACHMENT FOR A TRACTOR
Filed April 23, 1954                    2 Sheets-Sheet 1
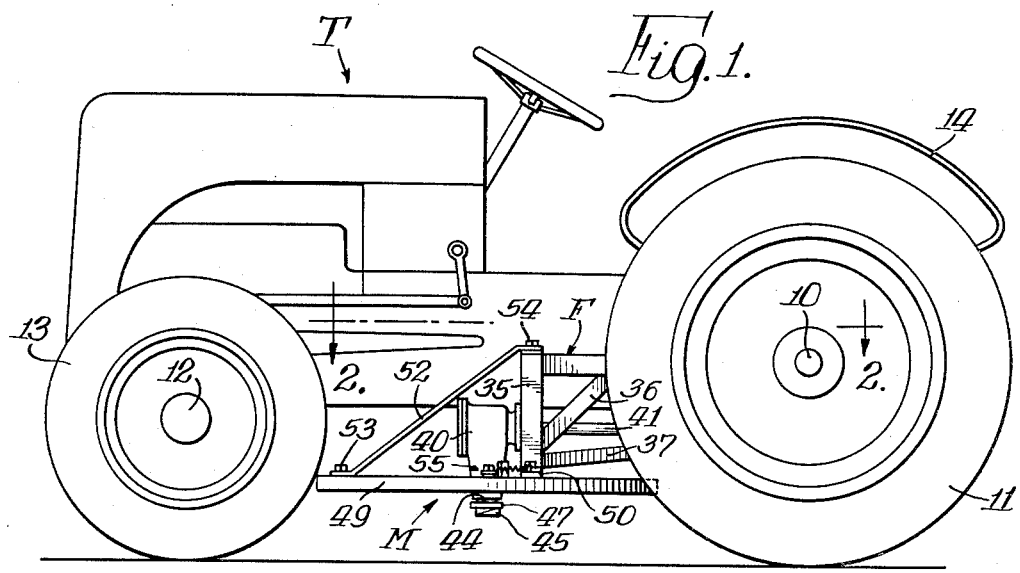
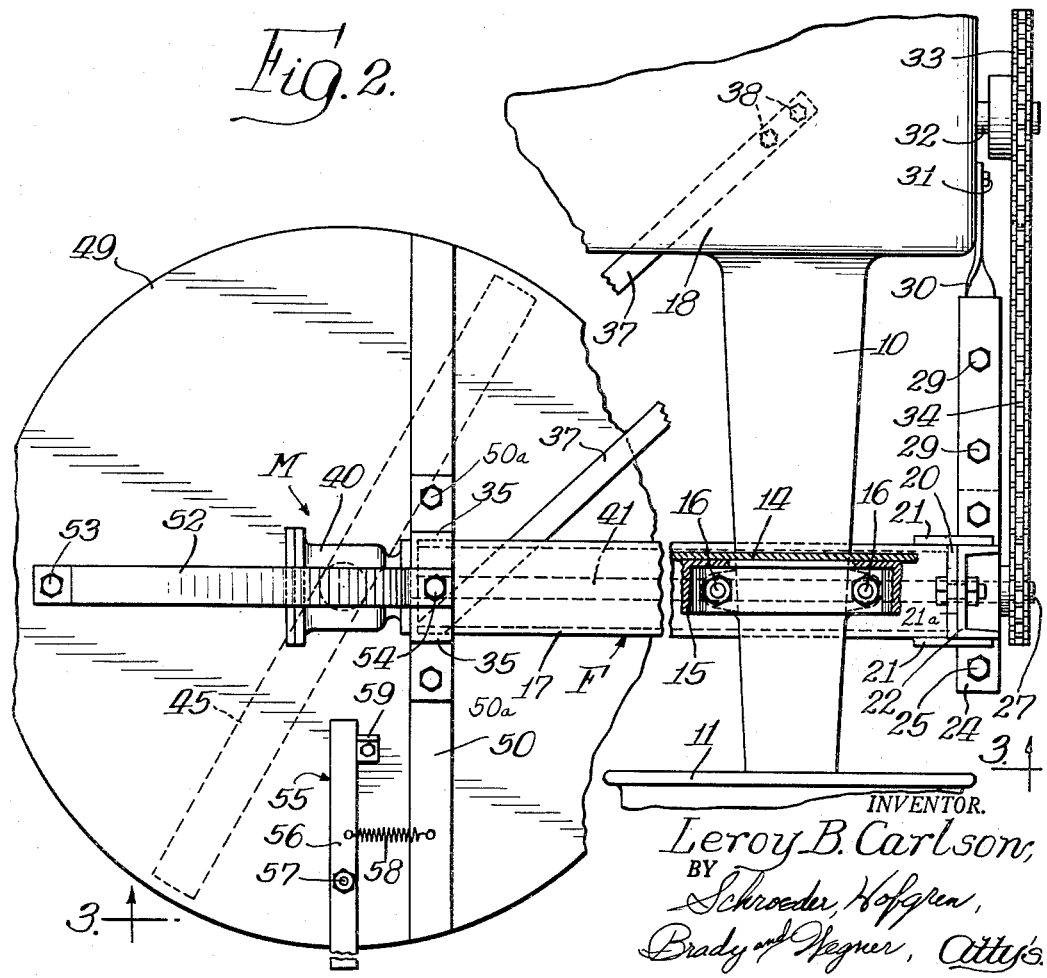
INVENTOR.
Leroy B. Carlson,
BY Schroeder, Hofgren,
Brady and Wegner, Atty's.

Nov. 15, 1955   LE ROY B. CARLSON   2,723,518
ROTARY MOWER ATTACHMENT FOR A TRACTOR
Filed April 23, 1954   2 Sheets-Sheet 2

INVENTOR.
Leroy B. Carlson,
BY Schroeder, Hofgren,
Brady and Wegner, Atty's.

United States Patent Office 2,723,518
Patented Nov. 15, 1955

2,723,518

ROTARY MOWER ATTACHMENT FOR A TRACTOR

Le Roy B. Carlson, Lewis, Iowa

Application April 23, 1954, Serial No. 425,133

1 Claim. (Cl. 56—25.4)

This invention relates to a rotary mower adapted for attachment to a farm tractor, and more particularly to a rotary mower which attaches beneath the tractor and adjacent one side thereof.

The principal object of the invention is a new and improved rotary mower.

Another object of the invention is a rotary mower in which the mower head is positioned approximately midway between the front and rear wheels of a tractor, so as to afford the following advantages:

(1) Short support arms, permitting sturdy construction with relatively light weight;

(2) Short, very simple power transmission;

(3) Does not affect length, width, or turning radius of the tractor;

(4) The mower is in a location where the tractor operator is best able to see approaching obstacles which might damage the blades; and (5) The position of the blade conforms more closely to ground contour than is possible with a mower which is either ahead of the wheels or behind them; the mower head "floats" with the ground because of its position between the wheels.

Another object is to provide a rotary mower which may be easily attached to either side of the tractor so as to permit the operator to mow on either side.

A further object is to provide a rotary mower adapted to be adjusted in a vertical manner in order to conform to the working conditions.

Various other objects and advantages of the invention will hereinafter become more fully apparent from the following description of the drawings, wherein:

Fig. 1 is a side elevational view of a farm tractor on which the invention is attached;

Fig. 2 is an enlarged fragmentary sectional view taken approximately along the line 2—2 of Fig. 1 and with parts broken away and shown in section;

Figure 3:
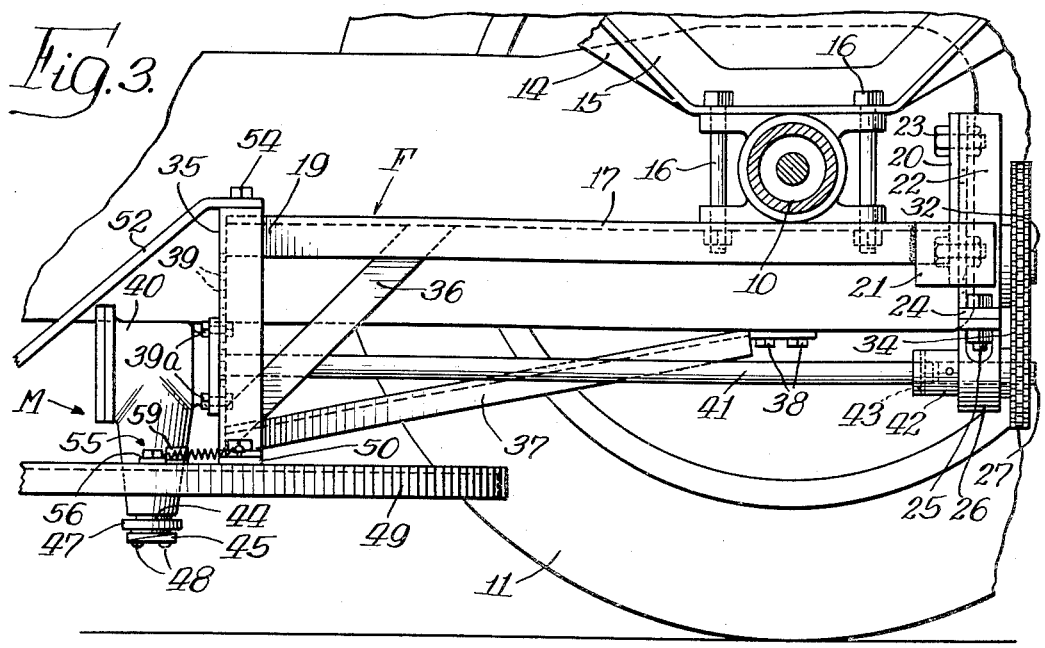
Fig. 3 is a sectional view of the device taken along the line 3—3 of Fig. 2.

While this invention is susceptible of embodiment in many different forms, there is shown in the drawings and will herein be described in detail, one specific embodiment, with the understanding that the present disclosure is to be considered as an exemplification of the principles of the invention and is not intended to limit the invention to the embodiment illustrated. The scope of the invention will be pointed out in the appended claims.

Referring to the drawings in greater detail, a farm tractor T has a wheeled frame which includes a rear axle 10 on which are mounted rear wheels 11, and a front axle 12 on which are mounted front wheels 13. Fenders 14 are secured to the rear axle 10 by means of brackets 15 and long bolts 16 extending through said brackets.

Figure 4:
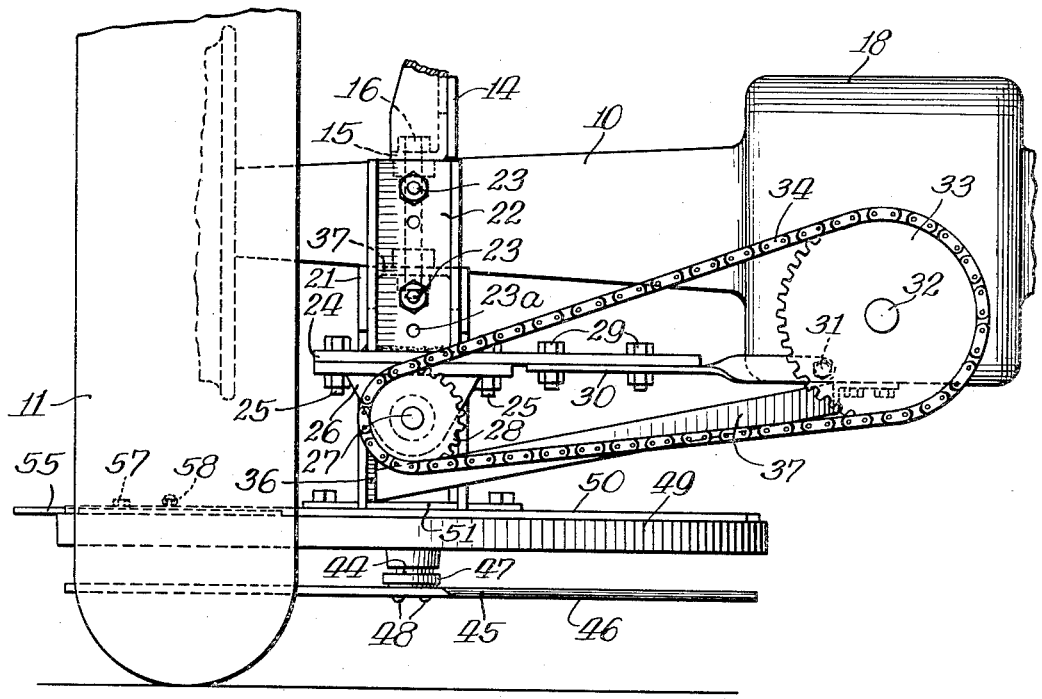
Fig. 4 is an enlarged rear elevational view of the invention, with parts broken away and shown in section.

A mower attachment embodying the invention is shown to include a frame, indicated generally at F, and a mower head, indicated generally at M. At least one such attachment may be mounted on tractor T and in the exemplary embodiment depicted in the drawings, one such attachment is shown mounted at the left side of the tractor. The frame F includes a channel member 17 which is secured beneath the rear axle by the long bolts 16 which secure the fenders 14. Thus, as seen in Figs. 1 and 4, said channel member 17 is positioned between the fender 14 and the differential housing 18 of the rear axle generally in alignment with the front wheel 13, and its forward end 19 is generally midway between the rear axle 10 and the front axle 12. The rear of the channel member 17 is generally opposite the rearmost portion of the differential housing 18, and has welded to it an upright plate 20 flanked by a pair of guide members 21 which form an upright support means or slideway 21a for a slidable channel-like sprocket bracket 22 which is adjustably secured to the slideway 21a by bolts 23 which may be mounted in any of the vertical series of bolt holes 23a. At the lower end of the bracket 22 is welded a cross member 24 beneath which is supported by means of bolts 25 a stub shaft bearing block 26 in which is journaled a stub shaft 27 carrying a small sprocket 28. The laterally projecting portion of the crossbar 24 carries bolts 29 with which to secure a brace 30, the inner end of which is anchored by a bolt 31 on the rear of the differential 18.

The bolt 31 is a portion of a cover assembly for a power take-off unit which is mounted in the lower portion of the differential housing 18 and has a rearwardly projecting driven shaft 32. Keyed on the shaft 32 is a sprocket 33 to receive a roller chain 34 by means of which the sprocket 28 is driven from the power take-off shaft 32.

At the forward end 19 of the channel member 17 is welded a pair of upright slideways or angle members 35 which are supported by means of diagonal braces 36 and a long brace member 37 which is bolted to one of the angle members, and to the underside of the differential housing 18 by means of bolts 38. The angle members 35 are provided with a series of vertically spaced holes 39 to adjustably receive bolts 39a for the support of a gear box 40 which forms a part of the mower head M. A drive shaft 41 which extends longitudinally beneath the channel member 17 is splined into the gear box 40 at its forward end and has its rear end extending into a fixed coupling collar 42 on the front of the stub shaft 27. The shaft 41 is pinned into the coupling collar 42 by means of a shear pin 43 which performs the normal function of protecting both the drive mechanism of the tractor and the mower blade in case the latter is jammed by contact with a fixed object.

The gear box 40 is provided with gears which transmit power from the shaft 41 to a mower shaft 44 which is at right angles to the shaft 41, and attached to said mower shaft 44 is a horizontal mower blade 45 which, as best seen in Fig. 4, has its end portions sharpened to provide cutting edges 46 which extend slightly beyond the outer line of the rear wheels of the tractor to permit the unit to mow very close along a fence line.

A circular safety shield 49 completely covers the mower blade 45 and has a transverse stiffening rib 50 which is secured by bolts 50a to a cross bracket 51 on the lower ends of the angle members 35. Auxiliary support for the safety shield 49 is afforded by an inclined strap 52 which is bolted to the forward edge portion of the shield by means of a bolt 53 and to the top of the channel member 17 by a bolt 54.

In order to permit the mower to be operated as close as possible to a fence or other obstruction, a warning device, indicated generally at 55, is mounted on top of the shield 49. The warning device includes a knocker bar 56 which is pivotally mounted at 57 and projects laterally a short distance beyond the edge of the shield, and a tension spring 58 which is secured to the knocker bar 56 and to the stiffening rib 50 on the safety shield 49 to hold the rear end portion of the knocker bar 56 against an upstanding stop member 59. If the tractor is driven close to an obstruction, such as a fence, the knocker bar 56 scraping along the fence swings about its pivot 57 and is repeatedly knocked against the stop member 59 by the action of the tension spring 58 to provide both a visual and an audible warning that the tractor should be steered no closer to the fence.

It is clear from the foregoing description that the present invention provides a greatly improved mower for attachment to farm tractors. The height of the mower head M and blade 46 is easily adjusted by vertical movement of the gear box 40 and the bracket 22 for the bearing block 26 keeping the shaft 41 horizontal. The relatively long radius from the power take-off shaft 32 to the stub shaft 27 permits reasonable adjustment of the height of the mower without the necessity for any lateral motion of the bearing block 26, the slight difference in radius as the stub shaft 27 moves vertically being taken care of by allowing more or less slack in the roller chain 34.

The unit may be easily mounted on either side of the tractor, and is quickly detachable if it is in the way when the tractor is to be used on any particular job. On the other hand, the mower frame F and mower head M may be left in place, and the mower drive stopped by removing the sprocket 33 from the power take-off shaft 32, which also frees the power take-off for other use.

The location of the mower head conforms the angle and height of the blade 45 most accurately to the surface of the ground, and permits the driver of the tractor to observe easily the presence of any obstructions which would interfere with mower operation. The fact that the span of the blade 45 extends beyond the outer line of the rear wheel in combination with the warning device 55, permits the mower to cut within an inch or two of a fence or other obstruction.

I claim:

In a tractor having a frame which includes front and rear axles each having a pair of wheels mounted at opposite ends thereof and a power take-off unit in said rear axle having a rearwardly extending power take-off shaft, a rotary mower attachment comprising: a longitudinal frame member having a front end and a rear end adapted to be secured intermediate its ends to the tractor rear axle adjacent one of the tractor wheels; a vertically extending rear slideway carried by said frame member at said rear end and arranged to be substantially aligned longitudinally with the tractor power take-off shaft; a vertically extending front slideway carried by said frame member at its front end; power transmitting means carried in said slideways including a sprocket carried by a bearing block carried in said rear slideway, a gear box carried by said front slideway generally in the horizontal plane of the axis of said sprocket, and shaft means operably interconnecting said sprocket and gear box; bolt means on said slideways for fixedly securing said power transmitting means therein in any one of a plurality of vertical positions while maintaining the horizontal relationship thereof; roller chain means for driving said sprocket from the tractor power take-off shaft; and a mower blade connected to said gear box for rotary movement.

References Cited in the file of this patent

UNITED STATES PATENTS

| 1,054,256 | Taylor | Feb. 25, 1913 |
| 1,471,798 | Merrill | Oct. 23, 1923 |
| 1,675,903 | Murphy | July 3, 1928 |
| 2,272,436 | Serigt | Feb. 10, 1942 |
| 2,530,041 | Bennett | Nov. 14, 1950 |
| 2,576,886 | McCoy | Nov. 27, 1951 |
| 2,589,845 | Mott | Mar. 18, 1952 |
| 2,685,160 | Kuhary et al. | Aug. 3, 1954 |

OTHER REFERENCES

Popular Mechanics, May 1950, page 109.